W. J. PERKINS.
SOUND DETECTOR AND RECORDER.
APPLICATION FILED MAY 22, 1917.
1,329,925.
Patented Feb. 3, 1920.
3 SHEETS—SHEET 1.
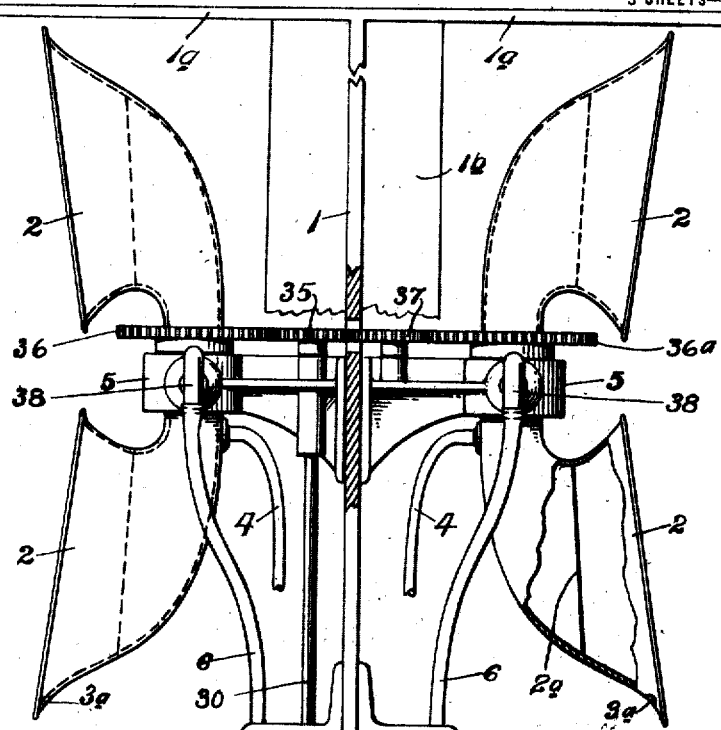
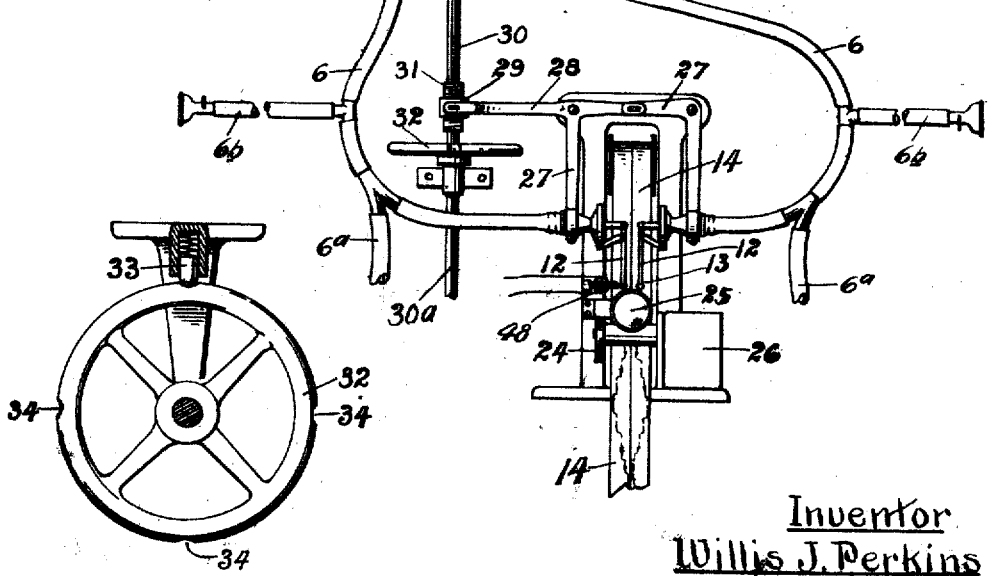
Fig. 1.
Fig. 7.
Inventor
Willis J. Perkins
By
Attorneys

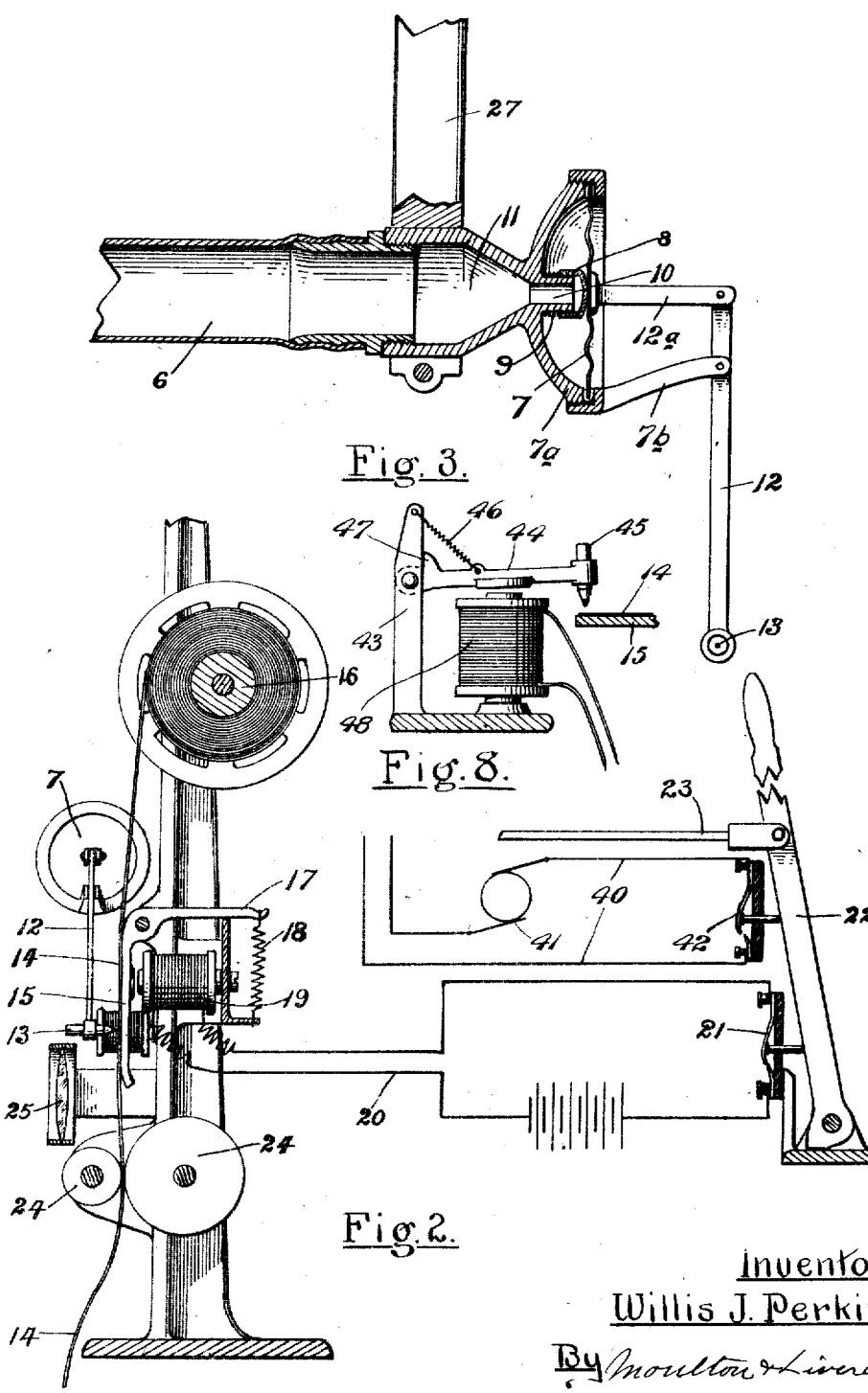

W. J. PERKINS.
SOUND DETECTOR AND RECORDER.
APPLICATION FILED MAY 22, 1917.

1,329,925.

Patented Feb. 3, 1920.
3 SHEETS—SHEET 3.

Inventor
Willis J. Perkins
By Moulton & Linerance
Attorneys

UNITED STATES PATENT OFFICE.

WILLIS J. PERKINS, OF GRAND RAPIDS, MICHIGAN, ASSIGNOR TO FRANCES W. PERKINS, OF GRAND RAPIDS, MICHIGAN.

SOUND DETECTOR AND RECORDER.

1,329,925.  Specification of Letters Patent.  Patented Feb. 3, 1920.

Application filed May 22, 1917. Serial No. 170,273.

*To all whom it may concern:*

Be it known that I, WILLIS J. PERKINS, a citizen of the United States of America, residing at Grand Rapids, in the county of Kent and State of Michigan, have invented certain new and useful Improvements in Sound Detectors and Recorders; and I do hereby declare the following to be a full, clear, and exact description of the invention, such as will enable others skilled in the art to which it appertains to make and use the same.

This invention relates to a sound detecting and recording appliance adapted for use especially upon ships or other sea going vessels, though the appliance is not limited in any respect to the one particular use. One of the objects and purposes of the invention is to provide means which will receive and visibly record sound waves, the record thereof being such as to indicate the amplitude of the waves and the direction from which they come and means whereby it can be quickly determined how near the sound is to the ship or vessel upon which the appliance is installed. This is of especial value in detecting and determining the position of other ships during atmospheric conditions which render them invisible from the danger signals intermittently sounded from such ships during such periods. A further object of the invention resides in the ready adjustability of the immediate sound wave receiving devices whereby they may be shifted to different positions or quarters to detect the presence of sound waves coming from different directions with respect to the course of the ship on which the appliance is installed. A still further object of the invention consists in the provision of mechanism to automatically cut out and render ineffective the recording devices during the same time that the whistle or other signal is sounded on the ship on which the apparatus is installed whereby a confusion of records may be avoided. Many other subsidiary objects and purposes will appear together with various novel construction and arrangements of parts for attaining the ends stated and others not specifically enumerated, as understanding of the invention is had from the following description taken in connection with the accompanying drawings illustrating a practical and preferred embodiment and in which:

Figure 1 is an elevation of the mechanism with various parts broken away and shown in section to better disclose the construction.

Fig. 2 is a side elevation, partly in section, of the recording part of the mechanism and illustrating the means for automatically rendering the recording mechanism ineffective at certain times and at the same time effecting a wireless discharge from the ship which with the signal sounded will be recorded on any adjacent ship having similar apparatus installed.

Fig. 3 is a fragmentary section of one portion of the sound receiving and recording appliance.

Fig. 7 is a plan and sectional view illustrating a constructive detail for the manual operating of the sound receivers and, Fig. 8 is an elevation, partly in section, of the wireless actuated recording mechanism.

Like reference characters refer to like parts throughout the several views of the drawings.

Figure 4:
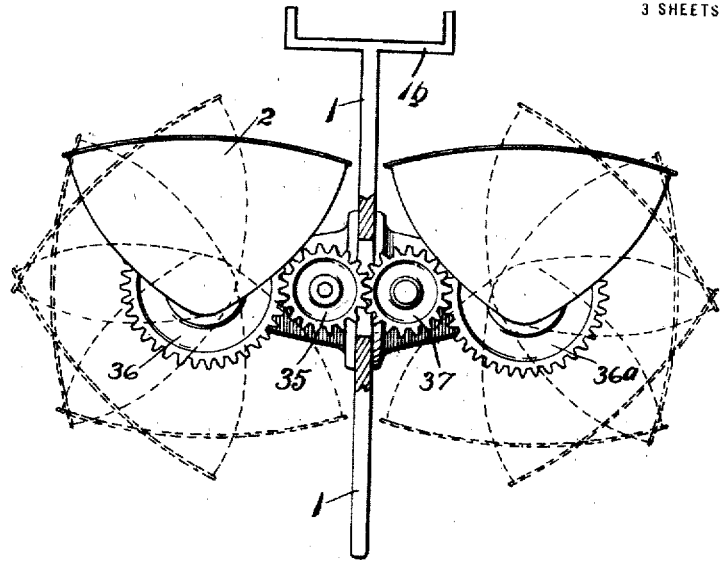
Fig. 4 is a plan view, with parts in section, illustrating the different positions of the sound receivers and the immediate mechanism for moving the same.

The construction embodying my invention includes a vertical non-sonorous partition 1 at the upper end of which project horizontal covers 1ᵃ as shown, and in front of which is located a relatively narrow vertical sound baffle 1ᵇ of the form best shown in Fig. 4. At each side of partition 1 sound receiving members are located each of which may comprise an upper and lower substantially horn shaped member 2. Of course a single member may be used, the principle of operation being the same. The ends of said horns come together and are joined in any suitable manner, either by being formed integral or suitably connected in any other way. Each horn 2 adjacent its open end may carry a resonant disk 2ᵃ positioned across it for amplifying the sound of waves coming thereto and for serving the additional function of preventing the entrance of water into the members. Each horn 2 may also be formed with double walls separated a short distance from each other to make a space 3 into which steam may be introduced through a pipe 4, the water condensed from the steam escaping through outlet openings 3ª adjacent the lowermost point of the lower horns 2. Each sound receiving member is rotatably mounted in the end of a bracket 5 such brackets being connected to and extending in opposite directions from the partition 1 and being enlarged and cored out around the sound receiving members through which openings are made at the center for the passage of the sound waves into the hollowed out spaces in the brackets. A conduit pipe 6 leads into each of the brackets 5 the interior communicating with the hollowed out portion of said brackets. Said pipes may be led to any suitable location for the transmission of the sound waves gathered by the sound receivers to the recording apparatus which will now be described.

A diaphragm 7 is suitably mounted in the end of a cup 7ª, its center bearing against a cap 8 covering the end of a neck 10 and which is pressed against the diaphragm by a spring 9, preferably of light tension. The support 7ª and the neck 10 are preferably case integral with a member 11 attached in any suitable manner at the end of each pipe or conduit 6 as shown in Fig. 3. The sound waves coming through pipes 6 are concentrated through the tapered sides of member 11 and enter the passage in the neck 10, impinging against cap 8 and thereby causing the diaphragm to vibrate in direct proportion to the amplitude of the sound waves. An arm 7ᵇ projects from the part 7ª on which is pivotally mounted an arm 12, a recording element 13 being mounted at the free end of the arm. The opposite end of the arm is pivotally connected to a rod 12ª provided with an enlarged head which is attached to the diaphragm member, it being apparent that the vibration of the diaphragm imparts movement to the rod 12ª which causes the arm 12 to move back and forth about its pivot. In practice the distance from the element 13 to the pivot of arm 12 is greater than the distance from the pivot of the arm to its connection with the rod 12ª whereby in recording, the wave length is proportionately multiplied and exaggerated.

The end of the recording element 13 presses against a strip 14 which may be of paper or like material adapted to receive the markings of the recording means. The strip passes between the end of the recording means and any suitable bearing support 15 as shown. In practice it is desirable to place a roll of the recording strip on a reel 16, unwind it continuously and move it over the support 15. I have provided a pivotal mount for the support and a horizontal leg 17 extending therefrom which is actuated by a spring 18 to normally force the support against the paper and the paper against the end of the recording means. An electromagnet 19 is located behind the support 15 being included in an electric circuit 20 which normally is not closed. When the danger signal of the ship on which the mechanism is placed is sounded it is desirable that this sound shall not be recorded on the strip 14. To effect this the manually operable signal actuates, the lever 22 controls a switch 21 in the circuit and a connecting rod 23 leads therefrom to the danger signal whereby when the lever is moved to sound the danger signal, switch 21 is automatically released, closing and completing the circuit and thereby energizing the magnet 19, whereupon the support 15 is drawn away from the recording strip and no record of the vibration of the recording means is caused by the signal.

As one means of continuously taking the strip 14 from the reel, coacting rollers 24 may be used between which the strip passes. The rollers are driven by any suitable motor indicated at 26. I have also mounted a magnifying glass 25 in front of and at the proper distance from the strip 14 whereby the record markings made by the pencil may be magnified and more fully observed.

It is desirable that the sound receiving means shall be movable back and forth through an arc of substantially 180 degrees and stopped at a number of places in such movements and that the sound wave recorders shall similarly simultaneously change positions on the recording strip so that after the strip has received the record any marked variation in the record may be noted and the direction from which the sound came with respect to the ship readily determined. To this end I have mounted the members 11 carrying the vibrating disk 7 upon depending arms 27 of two bell crank levers each of which has a horizontal arm extending toward and pivotally and slidably connected to each other as shown in Fig. 1. From one of the bell crank levers a horizontal arm 28 projects which is connected at its end to a nut 29 threaded upon a threaded section 31 of a vertical shaft 30. The shaft has an operating wheel 32 secured in the periphery of which a plurality of spaced notches 34 are cut each adapted to receive the end of a spring pressed dog 33 to hold the wheel against accidental movements. Shaft 30 at its upper end carries a pinion 35 which at one side meshes with a gear 36 fixed to one of the sound receiving devices at one side of the partition 1, the pinion at its opposite side meshing with and driving a pinion 35 which in turn is engaged with a gear 36ª secured in the same manner as is gear 36 to the sound receiving device on the opposite side of the partition 1.

Figures 5, 6:
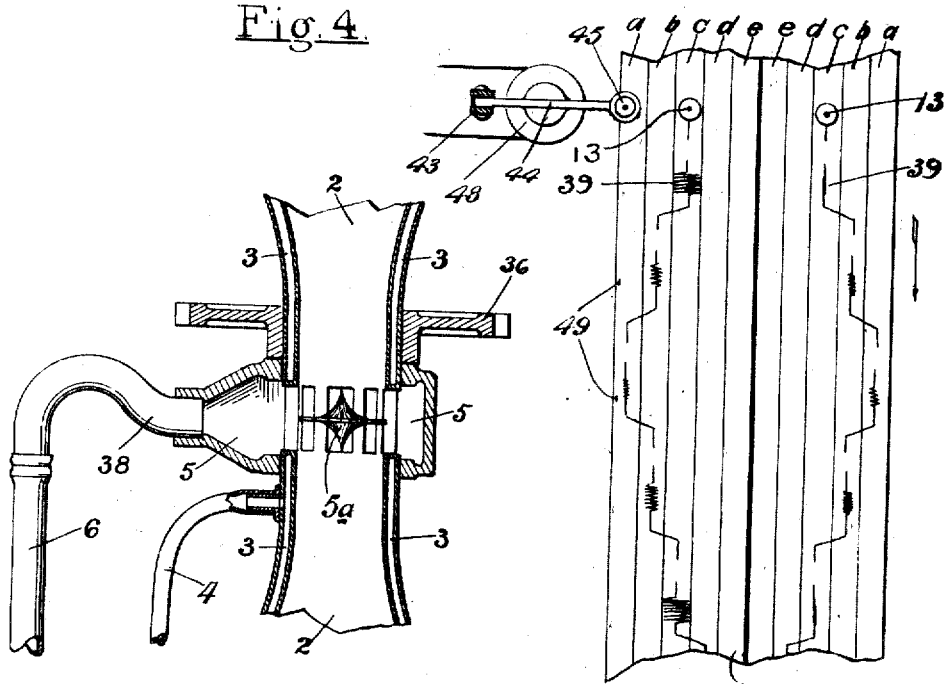
Fig. 5 is a fragmentary vertical section through the middle of one of the sound receivers.
Fig. 6 is a fragmentary elevation of the record strip and showing the sound and wireless recording devices associated therewith.

In operating the device the person in charge, by means of the hand wheel 32 shifts the danger signal receiving means 2—2 into such position, that the recording means produces the largest sound wave record and steers his ship to safety in accordance with the exact visible knowledge, thus obtained of the other ship's relative position and course, the device in fact constituting an eye, which sees the invisible by means of a visible record thereof. It will be noted with reference to Fig. 4 that the sound receivers may be turned to occupy five different positions, though of course it is to be understood that the sound receivers may be operated so as to stop at any desired number of positions. In the full line position of the sound receiver the recording means 13 are designed to be located in the columns c on the strip 14. As shown in Fig. 6 the recording means are located in the columns c or with the openings of the horns 2 in position to receive sound waves coming from points at right angles to the length of the ship. Each one quarter turn of the wheel 32 shifts the recording mechanism over one column. When the record is in the outside columns a, the sound receivers are in position to receive sounds coming from the rear of the ship after which the rotation of the hand wheel is reversed and in the opposite direction as will be understood. Sounds coming to the sound receivers are indicated upon the strip by a series of cross lines such as indicated at 39 and the record is in direct proportion to the volume of the sound and amplitude of the sound waves received. Small and insignificant sounds show little vibration of the recording means with respect to the recording strip 14 while the heavy sounds or those of greatest magnitude appear larger. From this it is evident that a glance at the record strip will show not only the relative nearness of other ships sending forth warnings by means of danger signals but also from reference to the columns in which the larger and more pronounced records appear it is easy to determine the relative locations of the nearest ships.

The gaps in the recording lines as shown on Fig. 6 indicate the times when the electro-magnet 19 is energized and the recording means made ineffective as described or those times when the danger signal on the vessel on which the apparatus is installed is sounded.

It is, of course, apparent that many changes in constructive details may be resorted to without departing from my invention. For instance, a double horn sound receiving apparatus is not particularly essential, one or more being used as desired at each side of the partition 1. Also the disks 2ª may not be used though they are desirable especially to exclude water. However, any water that passes the disks 2ª is kept from entering the tube 6 through the upward bend given to the tube as indicated at 38 where it is attached to the bracket 5. It is also desirable to interpose at the center of the double horn sound receiving apparatus a member of the formation shown at 5ª in Fig. 5, substantially a double cone, whereby the sound waves entering the upper and lower horns 2 do not in any way neutralize each other but are deflected through the openings in the sound receivers into the hollow end of the bracket 5 passing therefrom to the tubes 6. It is also apparent that a duplicate of the recording mechanism may be located at any other position on the ship and that branches 6ª to the sound conducting tubes 6 may lead to such mechanism, the rod 30 being extended as shown at 30ª and a duplicate recording and shifting mechanism attached thereto. I have also added an extension 6ᵇ to tubes 6 whereby the operator of the mechanism may listen to sounds gathered and on hearing any of appreciable magnitude may turn the sound receivers until the greatest is obtained and thus obtain the relative position of the adjacent ship or other dangerous object.

In this connection it should be noted that the device is adapted to record sound waves returning or echoing from a shore, cliff, iceberg or the like which may be somewhere near the ship on which the apparatus is installed, the sound returned being that which is given off on sounding the danger signal of the ship on which the apparatus is installed. The normal position of the sound receiving device should always be toward the bow of the ship whereby echoes from the ship's own danger signals thrown back from ice-bergs, cliffs, mountains or the like may be readily determined especially, by use of the listening tubes 6ᵇ, and, likewise, the sound or roar of the breakers on an adjacent shore may be thus determined and guarded against.

Another feature which may be incorporated with the sound receiving and recording mechanism described, consists in the provision of a wireless unit on a ship including wires 40 in a circuit with a suitable source of electric energy indicated as the dynamo 41, which circuit is adapted to be closed by a snap switch 42. The switch is normally held in inoperative position by the means, in this instance, the lever 22, by which the danger signal of the ship on which the apparatus is installed is operated. The wires of the circuit 40 lead to suitable antennæ so that when switch 42 closes the circuit a discharge is made therefrom. A support 43 may be located adjacent the recording structure 14, it having an arm 44 pivotally mounted thereon carrying at its end a recording element 45. Normally arm 44 is elevated by a spring 46 until shoulder 47 on the arm engages against the support, this moving the recording lever 45 away from the strip 14. An electromagnet 48 is mounted on the support and associated with the arm 44 whereby when the magnet is energized the recording element 45 is brought into contact with the recording strip 14.

When a danger signal is sounded on an adjacent ship and at the same time a wireless discharge given off from the ship, the ship on which the recording apparatus is installed has its electromagnet 48 energized by said discharge through any suitable receiving apparatus for the discharge, and a mark such as indicated at 49 is made on the recording strip. The wireless discharge and the sounding of the danger signal on an adjacent ship occur at the same time but the travel of sound is at substantially 1100 feet per second while the travel of the electric discharge is so fast that it may be said to be received practically as soon as the discharge is made. This makes an appreciable and measurable difference in the positioning of the wireless recording mark 49 and the sound wave 39. The recording strip 14 moving at a predetermined and known speed by the recording element 13, it is easy to determine from the distance between the initial points or beginnings of the two recording marks 49 and 39, the length of time which elapsed for the danger signal to come from its source to the ship on which it was received and, this length of time being known, the distance of the ship from the one making the record is readily determined.

These features as shown and many others not specifically outlined will occur to others skilled in the art and I, accordingly, do not wish to be limited to the exact specific construction shown but consider myself entitled to all modifications falling within the scope of the appended claims which define the invention. The disclosure made, while of a practical construction, is to be considered as diagrammatic and illustrative of the invention rather than as limiting it to any specific construction.

I claim:

1. In a mechanism of the character described, a sound wave receiver, a support therefor, means to move said receiver to a plurality of positions with respect to the support, recording apparatus, a record receiving member on which the recording apparatus makes a permanent record, and operative connections between said receiver and recording apparatus whereby sound waves coming to the receiver are recorded in direct proportion to their magnitude and in different positions on said record receiving member dependent upon the direction from which sound waves come to the sound receiver, substantially as described.

2. In a mechanism of the character described, a movably mounted sound wave receiving apparatus, recording apparatus connected and associated therewith, means for moving a relatively narrow and long recording strip past the recording apparatus to receive the record made by said recording apparatus, and means operated by the movements of the receiving apparatus to change the position of the recording apparatus relative to said strip.

3. In a mechanism of the character described, a sound wave receiving apparatus including a movably mounted wave receiver and collector, means to move said receiver and collector to a plurality of positions, a sound wave recording apparatus operatively associated with the receiving apparatus, means to move a record receiving member past said recording apparatus to receive the record made thereby, and means operated by the movements of the wave receiver and collector and operatively associated with the recording apparatus to change the position of the latter with respect to the record receiving member when the position of the sound receiver is changed, substantially as described.

4. In a mechanism of the character described, a sound wave receiving apparatus including a movably mounted sound wave receiver and collector, means to turn said receiver and collector back and forth through substantially a semi-circle in a series of steps, a sound wave recording apparatus, connections between the sound wave receiver and collector and the recording apparatus adapted to transmit the sound waves received to said recording apparatus, means to move a recording strip past said record receiving strip, apparatus to receive the record made thereby, and means interposed between the wave receiver and collector and recording apparatus and operated by the former to change the position of the recording apparatus with respect to the width of the strip when the position of the sound receiver is changed, substantially as described.

5. In a mechanism of the character described, a pair of sound wave receivers, supporting means therefor on which said receivers are movably mounted to turn about separate axes, gearing connections between the receivers whereby both receivers may be moved simultaneously and equal amounts, means for operating said gearing, and a recording apparatus operatively connected with each receiver whereby sound waves coming to a receiver are recorded in direct proportion to their volume, substantially as described.

6. In a mechanism of the character described, two oppositely disposed sound wave receivers mounted to turn about vertical axes, gearing connections between the receivers whereby the same may be turned simultaneously back and forth through substantially a semi-circle, means for operating the same in a plurality of steps, and a recording apparatus operatively associated and connected with each receiver, substantially as described.

7. In a mechanism of the character described, a plurality of sound wave receivers, a recording apparatus associated and connected with the receivers including separate recording devices, one for each receiver, means to move a recording strip past the recording devices, said strip receiving the record made by all of said devices, and means operated with the movement of the receivers to change the position of the recording apparatus with respect to said strip, substantially as described.

8. In a mechanism of the character described, a partition, sound receivers mounted one at each side of the partition adapted to turn about separate axes, means connecting the receivers for turning them simultaneously, a shaft operatively associated with said means, and a member secured to the shaft adapted for use in manually turning the shaft.

9. In a mechanism of the character described, a receiver including upper and lower horns connected together, a hollow bracket in which said receiver is rotatably mounted, said receiver having openings making communication between the interior thereof and the space within the bracket, means for turning the receiver to different positions, a conduit leading from said space, a member having an opening therethrough into which the conduit leads, a diaphragm closing the open end of the member, and a recording device operated by vibration of the diaphragm operatively associated with said diaphragm.

10. In a mechanism of the character described, a sound wave receiver comprising an open ended horn, a conduit connected to the horn to receive and conduct sound waves coming to the horn, a member formed with a passage therethrough to one end of which the conduit is secured, a diaphragm attached to and closing the other end of the member, an arm pivotally mounted between its ends and carried by said member, a rod pivotally connected to one end of the arm and having its end engaging with the diaphragm, and recording means carried by the free end of the arm.

11. In a mechanism of the character described, a sound wave receiver, a recording apparatus, including a movable recording element, operative connections between said receiver and recording apparatus whereby sound waves coming to the receiver are transmitted to the recording apparatus to agitate the recording element in direct proportion to the volume of said waves, a table included in the recording apparatus, a recording strip adapted to pass over the table between the same and the movable recording element and means normally pressing the table and strip against the recording element.

12. In a mechanism of the character described, a pair of sound wave receivers positioned in opposition to each other, means for rotatably mounting said receivers, a sound recording device for each receiver, operative connections between each receiver and its associated recording device whereby sound waves received by the receivers are transmitted to the said devices, a shaft, means for simultaneously turning said receivers in opposite directions on rotation of the shaft, and means connecting the shaft and the recording devices whereby said devices are moved in opposite directions on rotation of the shaft.

13. A mechanism as claimed in claim 12 in which each recording device is carried by one arm of a pivotally mounted bell crank lever, an operative connection between the other arms of said levers and means connecting one of the levers with the shaft to turn the levers in opposite directions about their pivots on rotation of the shaft.

14. A mechanism as claimed in claim 13 in which the means connecting one of the levers with the shaft comprises an arm extending from the lever, a nut secured at the end of the arm and a threaded section on the shaft on to which the nut is threaded, substantially as described.

In testimony whereof I affix my signature.

WILLIS J. PERKINS.